March 30, 1943. T. G. CUNNING 2,315,246
FRUIT DRYING MACHINE
Filed April 29, 1941 2 Sheets-Sheet 1

Inventor
THOMAS G. CUNNING
H. Calvin White
Attorney

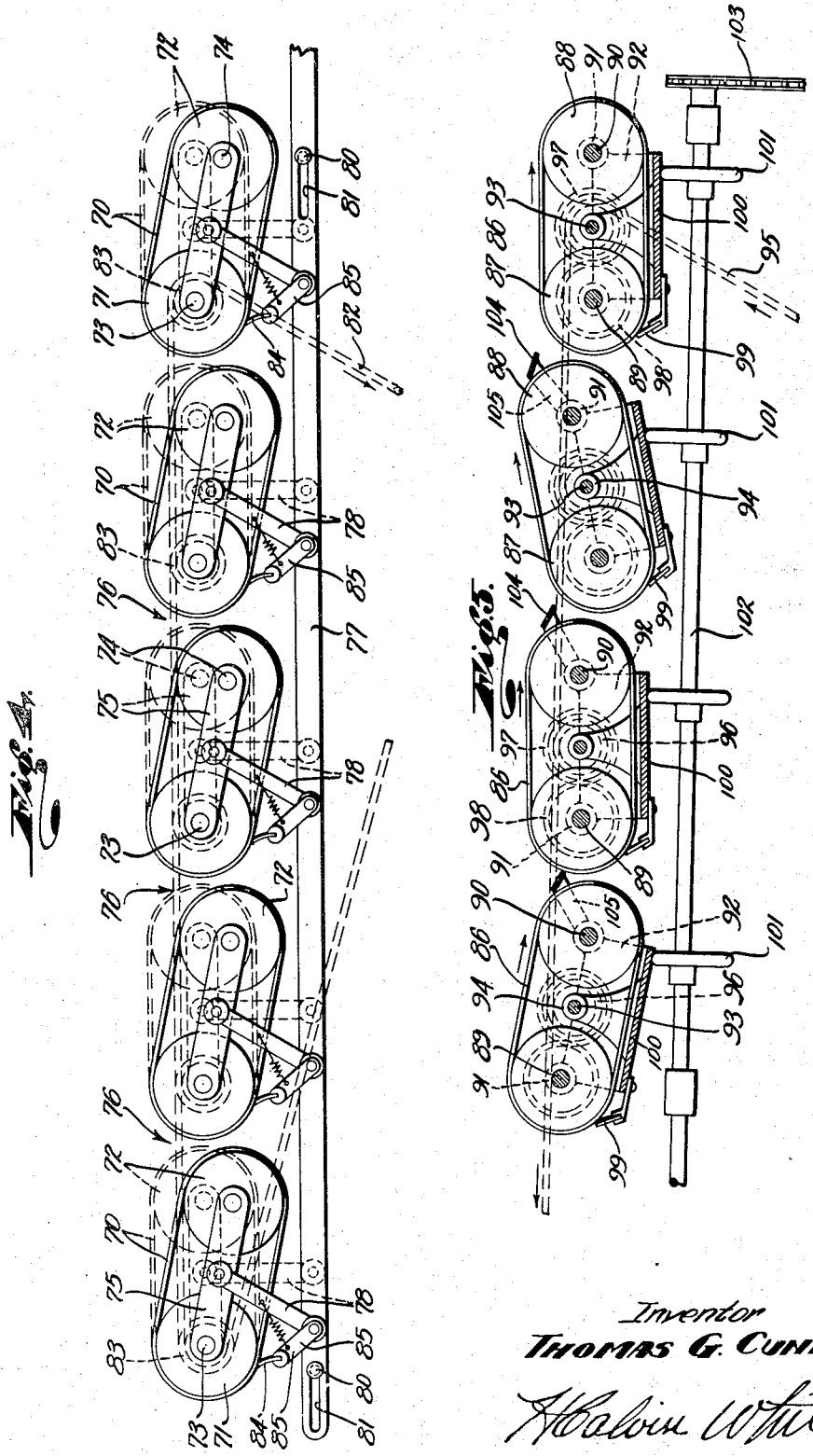

Patented Mar. 30, 1943

2,315,246

UNITED STATES PATENT OFFICE 2,315,246

FRUIT DRYING MACHINE

Thomas G. Cunning, Upland, Calif.

Application April 29, 1941, Serial No. 390,918

8 Claims. (Cl. 34—95)

This invention relates generally to fruit treating apparatus, and has to do particularly with improvements in fruit drying equipment for efficiently removing surface moisture from fruits in general, and especially citrus fruits.

The invention may be characterized as providing various improvements in belt-type fruit driers, i. e. in which the wet fruit is passed over a series of belts to which the fruit-carried moisture is transferred, and from which the moisture thus transferred is constantly removed. Generally speaking, it has been common practice in the art to pass the wet fruit onto a single absorptive surface endless belt, or a pair of such belts in series arrangement and moving in the same direction, with the object of causing the belt to absorb moisture from the fruit. In such instances, the fruit supporting spans of the belts have been substantially horizontal so that movement of the fruit has occurred by and in accordance with lineal movement of the belt. One disadvantage of these known belt-type driers is the limitation placed upon their fruit drying efficiency by reason of the lack of desirable wiping, as well as rolling, contact with the fruit. Another limitation has been due to the fact that heretofore the effective or fruit-contacting surfaces of the belts have been relatively long, so that in the course of their travel while contacting the fruit, the belts accumulate such large amounts of moisture as to prevent continued transfer of moisture from the fruit to the belt, that is required if the fruit is to be thoroughly dried.

In accordance with the invention, I have departed from the customary practices, by incorporating in the belt course, a series of relatively short length belts mounted for rotation in a common direction and supported in individually or relatively inclined positions to form valleys between successive or selected belt units. In traveling over the belt course, the fruit moves into the inter-belt valleys wherein, by reason of the configuration of the valleys and the belt movements, the fruit is subjected to both rolling and wiping contact with the belts, all in a manner assuring efficient removal of moisture from the fruit.

The invention contemplates various modifications in the construction and operation of the belt assembly such as I have generally described. As will later appear, successive belts may be driven at differential speeds to increase the effectiveness of their wiping or rolling contact with the fruit, and the belt positions may be rendered individually or relatively adjustable to vary the depths of the valleys, all to the same end of securing greater drying efficiency. Also as will later appear, the belt assembly may be operated in conjunction with independent means, such as overhead pushers, to advance the fruit through the machine, or the belt units may be oscillated in a sequential form of movement so as to properly advance the fruit over the belt series, without the aid of overhead pushers or other independent means.

All the various features and objects of the invention will perhaps be understood to better advantage by proceeding directly to a description of certain typical embodiments of the invention illustrated in the accompanying drawings. In the drawings.

Fig. 4 diagrammatically illustrates another form of the invention characterized by the provision, among other features, of a clean-out adjustment for the belt assemblies; and Fig. 5 is a view diagrammatically illustrating a still further embodiment of the invention.

Figure 1:
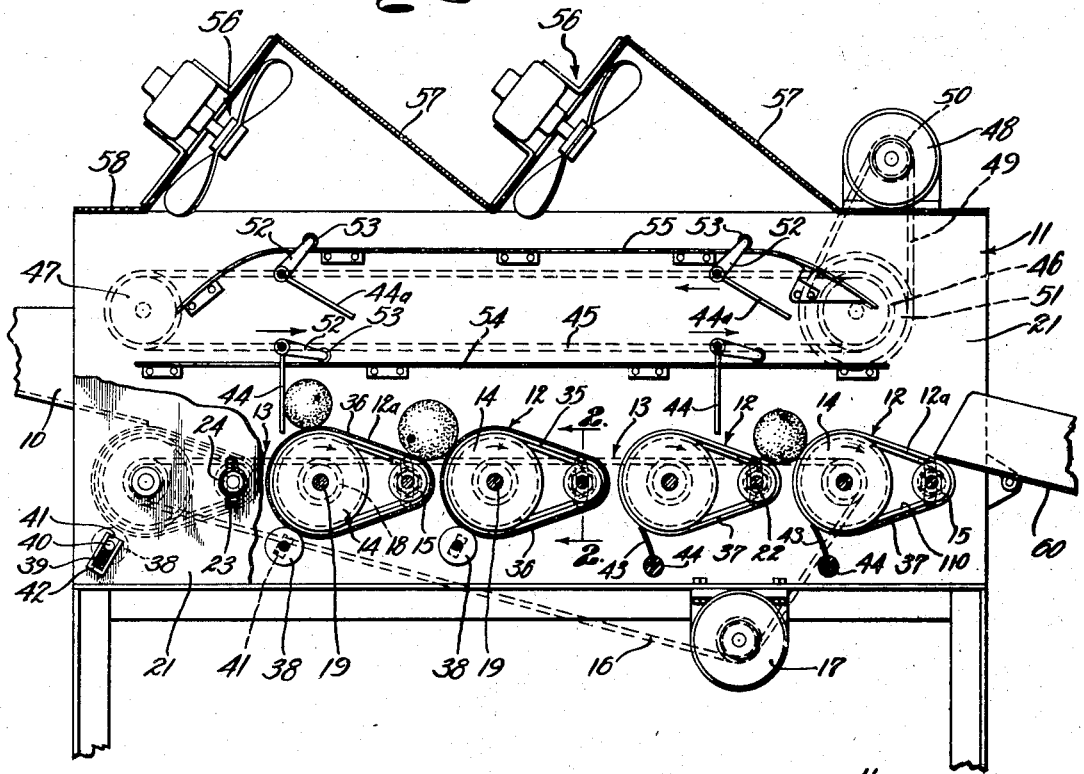
Fig. 1 is a side elevation, partly in section, illustrating a preferred embodiment of the invention.

Referring first to the preferred form of the invention shown in Fig. 1, the fruit fed from a chute or conveyor 10 travels a generally horizontal path of flow through the drier housing 11 over a series of fruit supporting and drying surfaces formed by relatively short length endless belts, generally indicated at 12, all being driven in the direction of the travel of the fruit. As illustrated, the belts 12 are arranged and supported to form transverse valleys 13 between successive belts, and to provide inclined belt spans 12a down which the fruit travels into the valleys 13 after being advanced over the high points of the belts. In the machine shown in Fig. 1, each belt 12 is carried by relatively large diameter (e. g. 6 in.) rolls 14 and smaller diameter (e. g. 3 in.) rolls 15, which in a typical instance may be about four feet in axial length and arranged with their axes spaced at about ten inches. It will of course be understood that the machine may contain any suitable number of these individual belt sections, and that the specific showing is illustrative only. An average size commercial drier will have say ten or twelve of these endless belt sections.

Figure 2:
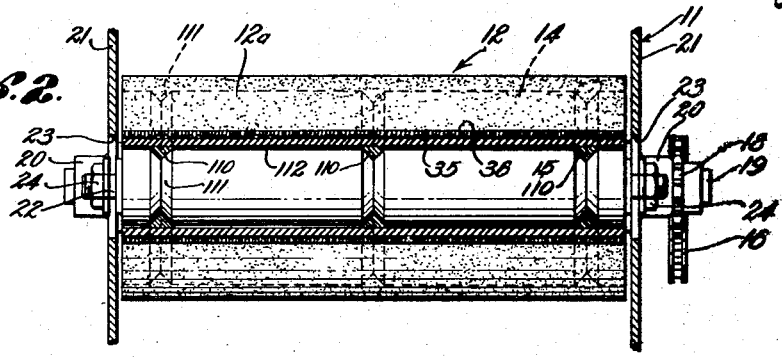
Fig. 2 is an enlarged fragmentary section on line 2—2 of Fig. 1.

The belts 12 are held against lateral displacement to assure their proper alinement with the rolls 14 and 15. The invention provides a distinct improvement in this respect, by securing to the belts 12 a suitable number, typically three, of V-belts 110 engaging within annular V-shaped grooves 111 in the surface of each roll, all as illustrated in Fig. 2. The V-belts 110 may be molded or formed integrally with the base layer 35 of the belt 12, or otherwise secured thereto in any desired manner. The V-belts desirably may support the main belt 12 in spaced relation to the roll, as at 112, except where the fruit load presses the belt 12 into engagement with the roll surfaces between the V-belts. In this manner the drive is transmitted mainly by the V-belts, and wear of belts 12 by frictional engagement with the roll is materially reduced.

The rolls 14 and 15 may simultaneously be driven in any suitable manner, as by a chain 16 driven by a motor 17 and passing over sprockets 18 carried on the ends of the large roller shafts 19. As illustrated in Fig. 2, shafts 19 are journaled in bearings 20 supported by the side walls 21 of the drier housing 11. The small roller shafts 22 may be similarly supported, although preferably they are rendered vertically adjustable in order that the depths of the valleys 13 may be predetermined or varied as desired. Typically, provision is made for adjusting the small roller shafts 22, by extending them through arcuate slots 23 in the housing side walls 21, the curvature of the slots being centered at the axes of the larger rollers 14, and shafts 22 being secured in adjusted position within the slots by tightening nuts 24.

Belts 12 may be made of suitable material presenting either absorptive or non-absorptive outer surfaces to contact the fruit. For example, the three belts at the left are shown to consist of a suitable base layer 35 to which is applied a surface layer 36 of absorptive material, such as porous toweling commonly used in fruit driers, or other absorbent such as sponge rubber. The two belts at the right may be made of any suitable belting material 37 presenting a smooth or non-absorptive outer surface. While it is generally preferred to provide all the belts with absorptive surfaces or surface layers 36, any suitable number and arrangement of non-absorbent belts 37 may be used in combination therewith. Surface moisture carried by the fruit and transferred to the belts, may be removed from the latter by any suitable means. As illustrative, moisture carried by the absorbent belts may be removed by wringer rolls 38 associated with rolls 14, and pressed against the belt by coil springs 39 bearing against end portions 40 of the wringer roll shafts projecting through slots 41 in walls 21 between guides 42. Moisture may be removed from the surfaces of the non-absorptive belts 37 by flexible wipers 43 carried by suitable supports 44.

When using the drier belt arrangement of Fig. 1, it is preferred to aid advancement of the fruit over the belt series, by means independent of the movement and traction effect of the belts themselves. For this purpose, I may provide a suitable arrangement of fruit pushers or movers mounted for movement above the belt series and traveling at a rate in accordance with the proper throughput of the machine. These pushers may consist of a series of flexible flaps or brushes 44 extending the width of the belts and carried at suitably spaced intervals on a chain 45 running about sprockets 46 and 47, the former being driven by a motor 48 through chain 49 carried by sprocket 50 on the motor shaft and sprocket 51 on the shaft of sprocket 46. When moving against the fruit, pushers 44 are supported by arms 52 carrying rollers 53 which ride the horizontal tracks 54. During return travel of the pushers, the latter are supported in their upper inclined positions 44a by engagement of the rollers 52 with a suitable cam track 55.

The drier assembly as described, optionally may be equipped with blowers or fans for projecting air against the belts, and against the fruit to evaporate and drive the surface moisture toward and upon the belts. Use of such fans of course will serve by partial evaporation of moisture, to reduce what may be termed the drying load imposed on the belt assembly. The drawing shows motor and fan assemblies, generally indicated at 56, mounted in hoods 57 on the top wall 58 of the housing 11, the hoods being inclined to direct the air downwardly in the direction of fruit travel through the machine.

In the operation of the machine, fruit fed over trough or conveyor 10 travels over the first belt 12 into the valley 13 wherein the fruit is given a rolling motion by contact with the two belts forming the valley. Due to the resistance to rotation of the fruit lying in the bottom of the valley, by engagement with oncoming fruit, rotation of the fruit most advanced in the valley usually will occur at a rate less than the belt speed, with the result that the belts have a wiping contact as well as a rolling contact with the fruit, and accordingly have greater effectiveness in removing moisture from the fruit. For the purpose of increasing the spinning action of the belts on the fruit in the valleys, particularly where rotation of the fruit is too greatly inhibited by interengagement of the pieces of fruit, or for other reasons, it may be desirable to operate successive belts at differential speeds. This may be done, for example, by slightly increasing the diameter and number of teeth in the sprockets 18 driving alternate rolls 14, so that the belts carried thereby will be driven at a speed somewhat in excess of the speeds of the immediately preceding belts.

Movement of the pushers 44 against the fruit, causes the latter to ride successively over the tops of rolls 14 and into the valleys 13 for a period of time and length of travel permitting the belts to absorb or otherwise receive substantially all the surface moisture from the fruit. Leaving the final belt 12, the dry fruit is discharged over trough or conveyor 60 for such other treatment or disposition as may be desired. Moisture absorbed by the belt layers 36 is continuously removed by the wringer rolls, and the flexible wipers 43 similarly remove the moisture carried on the surface of any non-absorptive belts used.

Figure 3:
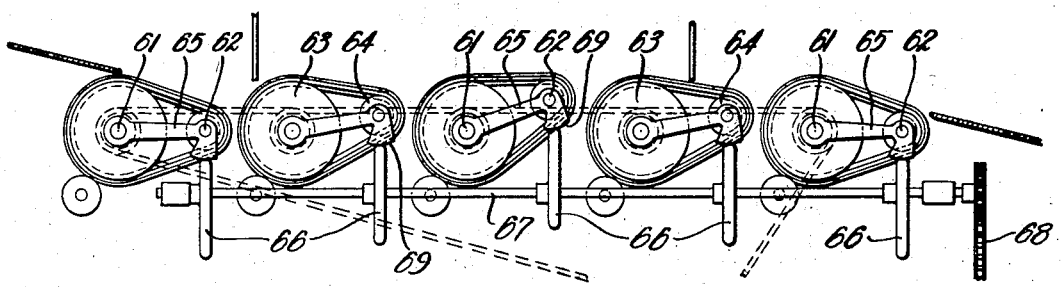
Fig. 3 is a diagrammatic view illustrating a variant form of the type of drier belt assembly shown in Fig. 1.

The general arrangement of the belts and their supporting rolls used in the form of the invention shown in Fig. 3, broadly is similar to the previously described form, but differs essentially in that each belt unit and roller assembly is given vertical oscillatory movement about the axis of the larger roll to aid or effect the travel of fruit over the series of belts. As illustrative of various mechanical drives for thus oscillating the individual belt assemblies, I have shown the shafts 61 and 62 of each pair of rolls 63 and 64 to be interconnected by links 65 at both ends of the rolls, thus supporting the small rolls 64 for oscillation about the axes of the larger rolls. Such oscillatory movement may be imparted by a series of circular cams 66 carried at varying degrees of eccentricity on a rotating shaft 67 driven by chain 68. Followers 69 carried by the links 65 ride the surfaces of cams 66. These cams preferably are arranged on shaft 67 to oscillate the belt assemblies in a wave-like sequence, substantially as illustrated, so that the tendency of the oscillating ends of the belt units will be to progressively advance the fruit from one belt to the next, and from trough to trough. It will be understood that the belt series of Fig. 3 may be used in conjunction with overhead pushers as in Fig. 1, or that the series of belts may be inclined in the direction of fruit travel, to a degree to which oscillation of the belts will advance the fruit without the application of extraneous force.

The form of the invention diagrammatically shown in Fig. 4 is similar in principle to the previously described embodiments, differing mainly in that it involves the use of corresponding size belt supporting rollers and the provision of an adjustment interconnecting the individual roller assemblies so that the belts may be swung from their normal inclined positions, into horizontal parallelism to facilitate cleaning out the machine. Like the view of Fig. 3, the showing in Fig. 4 is diagrammatic in nature, but sufficient to illustrate and describe its adaptability to any suitable housing structure which may incorporate the air blowers and traveling pushers above the belt series, all as specifically shown in Fig. 1.

In Fig. 4 the belts 70 shown to be smooth-surface belts although absorbent belting may be used if desired, are carried by corresponding diameter rolls 71 and 72. Rolls 71 rotate about fixed shafts 73, which may be journaled beyond the rolls in the side walls of a suitable support or housing, not shown. Rolls 72 are carried by shafts 74, the opposite ends of which are connected to shafts 73 by links 75, permitting rolls 72 and the belts 70 to be adjusted about shafts 73 to vary the depths of the troughs 76, or to swing the assemblies upward to the horizontal dotted line (clean-out) positions. The link and roller assemblies may be interconnected for simultaneous adjustment by any suitable mechanism, as for example a longitudinally movable bar 77 connected to links 75 by links 78 so that, for example, as bar 77 is moved to the right, links 78 will elevate the belts to an extreme upward position shown by the dotted lines. Bar 77 may be suitably supported, as by fixed pins 80 projected through longitudinal slots 81. The belts 70 are driven by chain 82 passing over sprockets 83 carried on the ends of shafts 73. all in a manner similar to the sprocket drive applied to rolls 14 in Fig. 1. Moisture is removed from the surfaces of the belts 70 by wipers 84 carried by the spring pressed arms 85, it being understood that wringer rolls may be substituted for the wipers where absorbent belts may be used.

I have illustrated in Fig. 5 a further variant form of the invention in which the belts 86 and their supporting rolls 87 and 88 are mounted for bodily oscillation about transverse axes intermediate the shafts of the rolls, for the purpose of enabling such bodily displacement of the belts to advance the fruit through the machine without necessity for independent fruit moving forces, as applied for example by overhead pushers, or otherwise. Here each pair of roller shafts 89 and 90 is supported within bearings 91 on the end portions of carrier 92, and the latter is mounted for oscillatory movement about shaft 93 positioned intermediate the roll shafts and extending through bearings 94 of the carrier 92. Shafts 93, which support the carriers, have fixed bearings and serve as mountings for sprockets 96 rotatable on the ends of the shafts and driven by chain 95. The rolls and belts are driven by sprockets 97, rotated with and by sprockets 96, and meshing with sprockets 98 keyed or otherwise secured to shafts 89. Moisture is removed from the surfaces of the belt by wipers 99 (or wringer rolls) mounted on the transverse base plates 100 of the carriers 92.

The individual belt assemblies may be oscillated progressively and in a wave-like sequence in a manner similar to the operation of Fig. 3, by eccentric circular cams 101 carried on rotating shaft 102 driven by chain 103, the cams engaging the base plates 100 of the carriers and operating to oscillate the belts and other carrier-supported parts about shafts 93, while the belts and rolls are being driven in a common direction, all as previously explained. The belt series may be arranged on a sufficient incline to cause the sequential oscillations of the individual belts to progressively advance the fruit along the entire belt course. To prevent fruit from becoming lodged in the valleys, elevators or lifting bars 104 rigidly connected to the carriers by arms 105, may be provided to assist in lifting the fruit over the rolls 87 ahead.

I claim:

1. In a fruit drying machine of the character described, a horizontally extending fruit supporting course comprising a series of endless belts having smooth outer surfaces over which wet fruit is movable, individual pairs of rolls within and carrying said belts, the top surfaces of the rolls within adjacent portions of successive belts being at different elevations to form troughs between such successive belts, means for driving said belts, means traveling above the belts and acting to move the fruit along said course, and wipers applied to the surfaces of said belts to remove moisture therefrom.

2. In a fruit drying machine of the character described, a horizontally extending fruit supporting course comprising a series of endless belts over which wet fruit is movable, individual pairs of rolls within and carrying said belts, the top surfaces of the rolls within adjacent portions of successive belts being at different elevations to form troughs between such successive belts, means for driving said belts, and means traveling above the belts and acting to engage and move the fruit along said course.

3. In a fruit drying machine of the character described, a horizontally extending fruit supporting course comprising a series of endless belts over which wet fruit is movable, individual pairs of rolls within and carrying said belts, the top surfaces of the rolls within adjacent portions of successive belts being at different elevations so that the top portions of the belts are correspondingly inclined to form troughs between successive belts, means for driving said belts, and means traveling above the belts and acting to engage and move the fruit along the belts in the direction of their inclination.

4. In a fruit drying machine of the character described, a horizontally extending fruit supporting course comprising a series of endless belts over which wet fruit is movable, individual pairs of rolls within and carrying said belts, the top surfaces of the rolls within adjacent portions of successive belts being at different elevations to form troughs between such successive belts, means for driving said belts, means traveling above the belts and acting to move the fruit along said course, and means bearing against the belts and acting to remove liquid water therefrom.

5. In a fruit drying machine of the character described, a horizontally extending fruit supporting course comprising a series of endless belts having moisture-absorptive outer surfaces over which wet fruit is movable, individual pairs of rolls within and carrying said belts, the top surfaces of the rolls within adjacent portions of successive belts being at different elevations to form troughs between such successive belts, a power source for driving said belts, means traveling above the belts and acting to move the fruit along said course, and means bearing against said absorptive surfaces of the belts for removing liquid water therefrom.

6. In a fruit drying machine of the character described, a horizontally extending fruit supporting course comprising a series of endless belts over which wet fruit is movable, individual pairs of rolls within and carrying said belts, the top surfaces of the rolls within adjacent portions of successive belts being at different elevations to form troughs between such successive belts, substantially V-shaped flexible projections on the inner surfaces of said belts and received within correspondingly shaped annular recesses in the rolls, means for driving said belts, and means traveling above the belts and acting to move the fruit along said course.

7. In a fruit drying machine of the character described, a horizontally extending fruit supporting course comprising a series of endless belts over which wet fruit is movable, individual pairs of differential diameter rolls within and carrying individual belts, the top surfaces of the rolls within adjacent portions of successive belts being at different elevations to form troughs between such successive belts, means for driving said belts, means traveling above the belts and acting to move the fruit along said course, and means applied to the belts below the roll axes for removing moisture from the belts.

8. In a fruit drying machine of the character described, a horizontally extending fruit supporting course comprising a series of endless belts over which wet fruit is movable, individual pairs of differential diameter rolls within and carrying individual belts, the axes of said rolls being disposed in substantially the same plane and the top surfaces of the rolls within adjacent portions of successive belts being at different elevations to form troughs between such successive belts, means for driving said belts, and means traveling above the belts and acting to move the fruit along said course.

THOMAS G. CUNNING.